(No Model.) 2 Sheets—Sheet 1.

F. W. NESSLY.
GRAIN HEADING MACHINE.

No. 515,871. Patented Mar. 6, 1894.

Witnesses:
J. F. Coleman
G. Dittman

Inventor.
Frank W. Nessly
By S. C. Fitzgerald
Att'y.

(No Model.) 2 Sheets—Sheet 2.

F. W. NESSLY.
GRAIN HEADING MACHINE.

No. 515,871. Patented Mar. 6, 1894.

Witnesses:

Inventor:
Frank W. Nessly
By J. C. Fitzgerald
Atty.

United States Patent Office.

FRANK W. NESSLY, OF LA GRANDE, OREGON.

GRAIN-HEADING MACHINE.

SPECIFICATION forming part of Letters Patent No. 515,871, dated March 6, 1894.

Application filed October 28, 1893. Serial No. 489,389. (No model.)

*To all whom it may concern:*

Be it known that I, FRANK W. NESSLY, a citizen of the United States, residing at La Grande, in the county of Union and State of Oregon, have invented certain new and useful Improvements in Grain-Heading Machines; and I do hereby declare the following to be a full, clear, and exact description of the invention, such as will enable others skilled in the art to which it appertains to make and use the same.

My invention relates to improvements in grain heading machines.

The object of my invention is to hold the platform in a horizontal position, and to permit of its ready adjustment in such position for either short or tall grain, thereby avoiding the extreme tilted or pitched position of platform and cutter bar, so common and unavoidable in other machines, and at the same time to allow it to be slightly tilted if desired.

Another object is to permit the reels to be automatically adjusted by the adjustment of the platform.

My invention will first be described in connection with the accompanying drawings, and then particularly pointed out in the claims.

Figure 1:
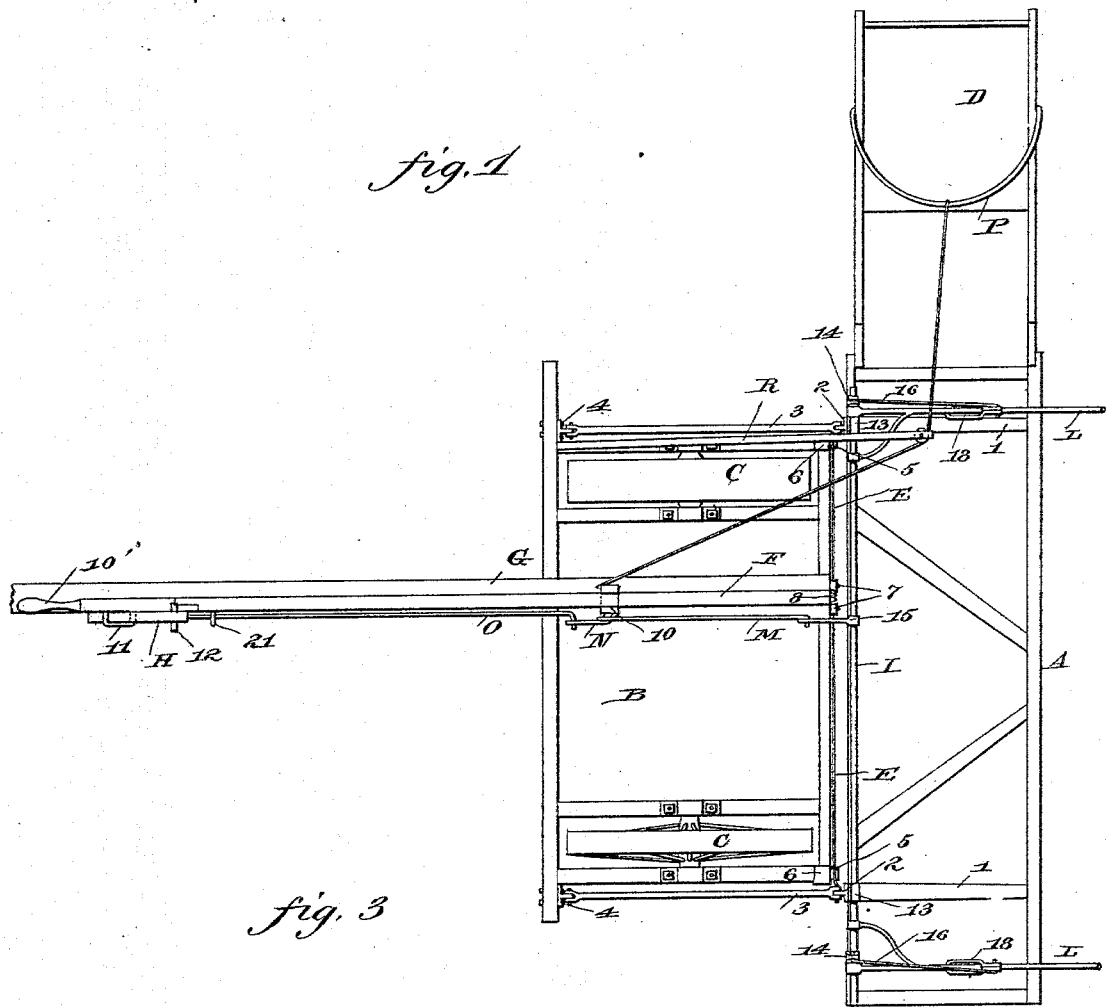
Figure 2:
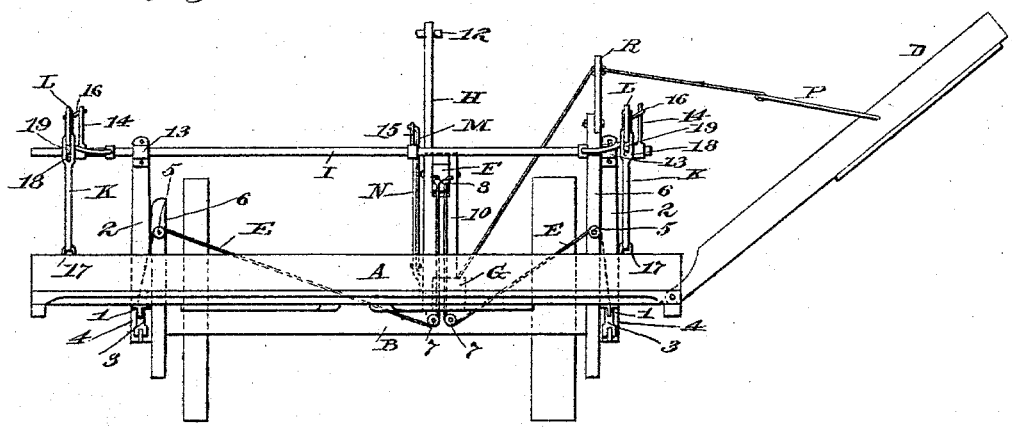
Figure 4:
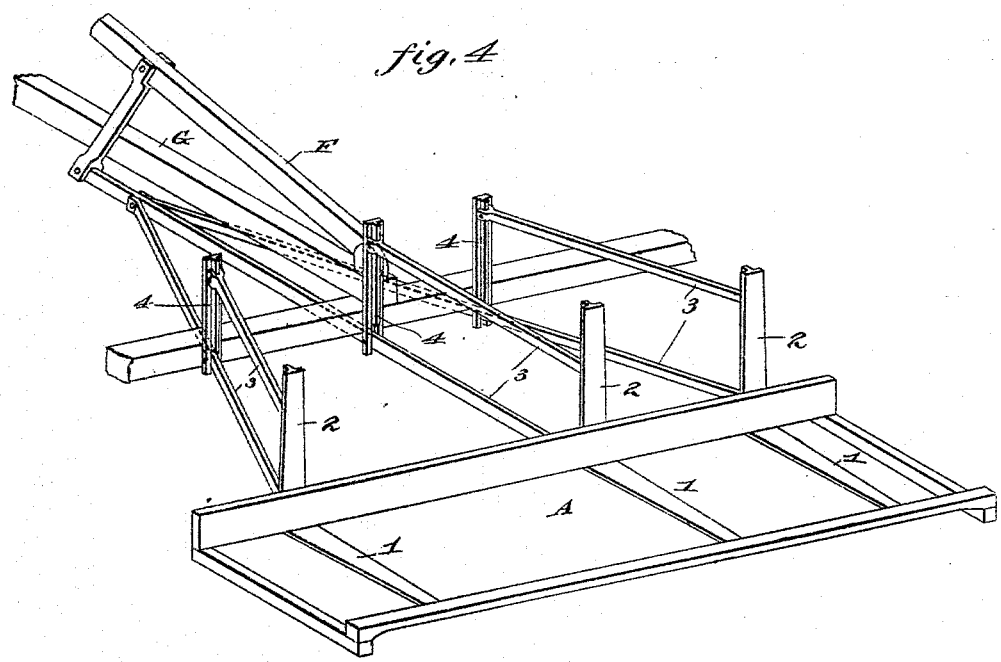

In the drawings—Figure 1 is a plan view of so much of a grain heading machine as is necessary to illustrate my invention. Fig. 2 is a front elevation of my machine. Fig. 3 is a side elevation of the same. Fig. 4 is a detail perspective view illustrating one modification of my invention.

Referring to the drawings, A is a platform frame carried on two brackets 1, which are provided with uprights 2, preferably of T-iron. To each upright is pivoted a pair of parallel rods 3, these rods being also pivotally attached at their rear ends to the standards 4 fixed in the frame B in which the wheels C are journaled. To the outer end of the platform is hinged the elevator in the usual way. For the purpose of raising and lowering the platform a pair of cables E preferably of wire are attached to the bottom of the uprights, passing thence over pulleys 5 mounted on posts 6 fixed to the frame B, the cables passing thence down and around pulleys 7 mounted on the frame B, and then upward to the end of a raising lever F where they are secured by suitable clamps 8 which permit the adjustment of the length of the cables. The raising lever is fulcrumed at 9 to a fulcrum-post 10 fixed on a reach-beam G projecting rearward from the main frame B, the rear end of the raising lever having a handle 10 and a guide 11 through which passes a guide lever H pivoted to the reach beam and provided with a stop device 12 at its upper end, this stop device preferably consisting of a pin passing transversely through the guide-lever, as shown. To the upper end of each upright is attached a journal 13 in which is mounted a rock-shaft I, having at each end a rocker-arm 14 and an intermediate arm 15 fixed to the shaft. The end of each rocker-arm, 14, is pivoted to a link 16, each link having its forward end attached to a swinging arm K fulcrumed at 17 on the rear of the platform and provided with an open link or slot 18 at its upper end in which is journaled a roller 19. The reel-shaft is supported on bracket-arms L which pass through the slots 18 and are loosely journaled on the rock-shaft I, the bracket arms resting on the rollers 19.

To the intermediate arm 15 is attached a coupling-rod M, which is connected to an operating-lever N, fulcrumed on the fulcrum-post 10 and moved by a hand-rod O provided with a handle 20 located within easy reach of the driver, the hand-rod being supported by a staple or eye 21 through which it passes.

The elevator D is provided with a bail support P to the center of which is secured a cable passing over a sheave mounted in the upper end of a crane-arm R carried from the main frame B, the other end of the cable being fastened to any suitable part of the main frame.

The operation of my device is as follows: By pushing the raising lever F downward the platform is raised, being held at all times in a horizontal position by the parallel rods, the elevator D having its outer end lowered, this being due to the fact that the pulley on the crane arm R serves as the center of an arc through which the bail support P moves as the lower end of the elevator is raised by the raising of the platform. At the same time that the platform is raised the rock-shaft is partly rotated thereby drawing the top end of the swinging arms rearward and consequently raising the bracket arms L which elevate the reel-shaft and reel. By lowering the raising-lever the above operations are reversed. The reel-shaft, it will be seen, is adjustable automatically and by moving the handle-rod longitudinally the rock shaft may be rotated and the bracket-arms raised or lowered by hand.

As it is sometimes convenient to give the platform a very slight inclination upward when cutting high grain or a similar slight inclination downward in cutting low grain, I provide the standards 4 each with a pin hole 22 in order that the top parallel-rods may be pivotally attached to the standards nearer the pivoted point of attachment of the lower parallel-rods, thereby giving the platform a slight tilting motion as it is raised or lowered, it being only necessary to pull out the pivot pins 23, slide down the rear ends of the top parallel-rods and insert the pins in the holes 22.

In Fig. 4 I have shown the manner of applying my invention to a machine having one axle and no main frame, the axle carrying the platform. In this case three standards are fixed to the forward face of the axle and three pairs of parallel-rods are used, the bottom rod of each pair projecting rearward back of the axle where the three rods meet and are united, the central one projecting a short distance farther to the rear where it is pivotally connected to a link having its upper end attached to the raising lever which is fulcrumed on the axle. In this case the operation is obvious from what has been heretofore said.

Having thus fully described my invention, what I claim as new, and desire to secure by Letters Patent, is—

1. In a header, the combination of a main frame, a standard 4, fixed with respect to the main frame, a movable platform having an upright 2, a bar 3, pivotally connected to the upright 2 and standard 4 adjacent to the lower ends thereof, and an upper bar 3, pivotally connected to the upright and detachably connected in a pivotal manner to the standard, whereby its rear end may be raised or lowered, substantially as and for the purpose set forth.

2. In a header, the combination of a vertically movable platform, a rock-shaft journaled on said platform and having a crank arm, a reel-carrying arm loosely connected to and extending forwardly from the rock-shaft, an arm K loosely connected to the platform at one end and having a roller at an intermediate point of its length in engagement with the reel carrying arm, and a link connecting the upper end of the arm K, and the crank-arm of the rock-shaft, whereby the reel carrying arm will be caused to move in concert with the platform, substantially as described.

3. In a header, the combination of a movable platform, a rock shaft journaled on the platform and having crank arms adjacent to its ends, reel carrying arms loosely mounted upon and extending forwardly from the rock-shaft, arms K, loosely connected to the platform at one end and having slots at an intermediate point of their length for the loose passage of the reel-carrying arms and also having anti-friction rollers in engagement with said arms, links connecting the upper ends of the arms K, and the crank-arms of the rock-shaft, and suitable means for rocking said shaft, substantially as specified.

4. In a header, the combination, with a platform, a pair of uprights secured to the platform, a pair of standards secured to the frame, a series of parallel rods connecting the standards and the uprights, and a cable for raising and lowering the platform, of a rock-shaft journaled in the top of the uprights, and provided with a pair of rocker-arms and an intermediate arm, means for attaching the intermediate arm to the frame of the header a pair of swinging arms provided with slots and pivoted to the platform, a pair of bracket arms journaled on the rock-shaft and passing through the slots in the swinging arms, and means for connecting the upper ends of the swinging arms to the rocker arms, substantially as described and for the purpose set forth.

In testimony whereof I affix my signature in presence of two witnesses.

FRANK W. NESSLY.

Witnesses:
OLOF JOHNSON,
WM. B. SARGENT.